G. A. SMITH.
KINEMATOGRAPH APPARATUS FOR THE PRODUCTION OF COLORED PICTURES.
APPLICATION FILED JUNE 11, 1907.
941,960. Patented Nov. 30, 1909.
Fig. 1.
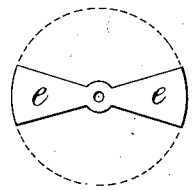
Fig. 2.
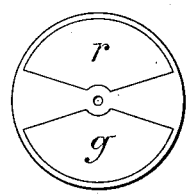
Fig. 3.
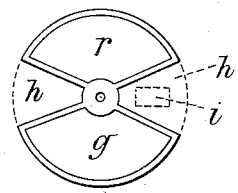
Fig. 4.
Fig. 5.
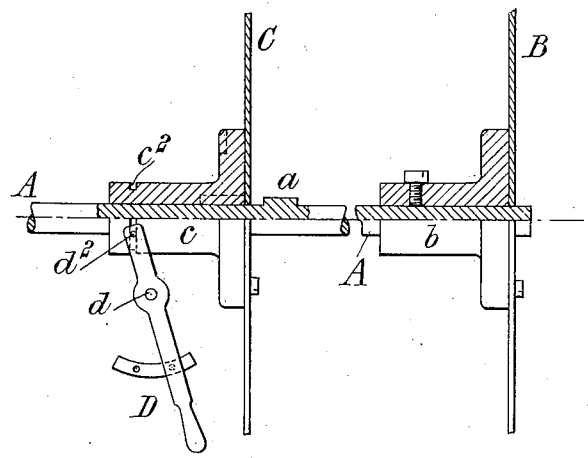
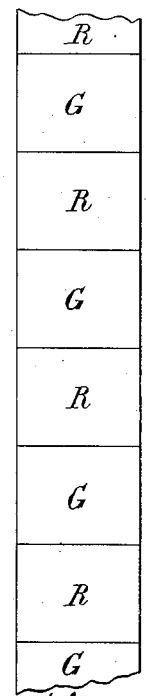
WITNESSES
Walter Abbr
L. H. Grote
INVENTOR
George Albert Smith
BY
Howson and Howson
ATTORNEYS

UNITED STATES PATENT OFFICE.

GEORGE ALBERT SMITH, OF SOUTHWICK, BRIGHTON, ENGLAND.

KINEMATOGRAPH APPARATUS FOR THE PRODUCTION OF COLORED PICTURES.

941,960.   Specification of Letters Patent.   Patented Nov. 30, 1909.

Application filed June 11, 1907. Serial No. 378,446.

*To all whom it may concern:*

Be it known that I, GEORGE ALBERT SMITH, a subject of the King of Great Britain and Ireland, of Laboratory Lodge, Roman Crescent, Southwick, Brighton, in the county of Sussex, England, animated-picture maker, have invented new and useful Improvements in and Relating to Kinematograph Apparatus for the Production of Colored Pictures, of which the following is a specification.

My invention has for its object to provide means whereby what are known as animated photographs, or bioscope moving pictures, can be exhibited so as to have the appearance of being in the natural colors, or approximately so, instead of being uncolored, or requiring the photographs to be colored by hand. It has been proposed to take, for such purposes, and exhibit, by kinematograph apparatus, photographs taken as three color records requiring three times the ordinary number of pictures for a given subject, but it has been found that the persistence of human vision is not such that the series of three successive color records, hitherto considered necessary for the exhibition of colors resembling the original, can be either taken, or exhibited, in the short space of time necessary to enable, on exhibition, the eye to retain, by persistence of vision, the impressions received from the three successive records so that the three color sensations appear to be received by the eye at the same time.

I have found that persistence of vision is such, however, that only series of two color records, (the records of one color sensation alternating with those of the other color sensation), are necessary to present to the observer the appearance of the picture being in its natural colors, or approximately so, and I have found that the red and green color sensations are sufficient to give such appearance. As it is possible to take and exhibit series of two color records with sufficient rapidity to comply with the requirements of persistence of vision as regards color sensation, I can therefore provide means whereby so-called moving photographs, or bioscope pictures, can be taken, by photography, as color records, and exhibited in apparently their natural colors.

In describing my invention I will refer to the accompanying drawings in which—

Figure 1 shows an ordinary rotatable shutter with two opaque parts, such as is used with some bioscope apparatus. Fig. 2 shows how such a shutter can be provided with transparent color screens for the purposes of my invention. Fig. 3 shows transparent color screens adapted to be used in combination with a shutter such as is shown in Fig. 1. Fig. 4 is an elevation partly in section showing how the transparent color screens Fig. 3 and the shutter Fig. 1 can be arranged, and how the said screens can be put out of action when it is desired to exhibit ordinary plain, or uncolored, subjects. Fig. 5 shows a part of a film comprising a series of alternating two color records in accordance with my invention.

According to my invention, negatives of records of two color sensations alternating with each other are photographed by apparatus which may be generally of the usual character for taking kinematograph pictures, but red and green transparent filters, or screens, are employed which are alternately brought into position as the photograph is being taken so that a kinematograph negative is obtained in which there will usually be about double the ordinary number of pictures for a given subject, and in which negatives of records taken with the intervention of the red filter, or screen, alternate with those taken with the intervention of the green filter, or screen. The photographic material, or negative film on which the pictures are taken in the camera, will of course be coated with an emulsion which has been rendered sensitive to the action of red, yellow, green and blue light, such an emulsion being known to photographers as panchromatic emulsion. I then make a positive from the negative so obtained and this is used in a kinematograph apparatus, which may be of the usual kind except that it is provided with a device, or shutter, furnished with two colored transparent screens, with the usual opaque parts between them, so adjusted as to conceal the change from record to record with the minimum of obliteration, the said colored transparent screens being of a character respectively similar, or sufficiently similar, to those used in taking the records that the alternate red and green color records are exhibited with the intervention of corresponding color screens, that is to say, as each alternate color record of the one character comes into position for exhibition, the correspondingly colored screen will simultaneously come into position, and as each of the other alternate color records of the other character comes into position for exhibition, the other correspondingly colored screen will simultaneously come into position. A rotating shutter with two apertures, or transparent parts, and opaque parts between, of the smallest size possible to conceal the change from record to record, will be a convenient device for the purpose, if the apertures be covered by the respective colored transparent screens.

Referring to the accompanying drawing, Fig. 1 shows a rotatable shutter with two blades $e$, such as is used in some bioscope apparatus, one blade shutting off the light during the change from the first to the second picture of the series, and the other blade shutting off the light during the change from the second to the third picture of the series, and so on throughout the entire length of the film, or photographic record. For the exhibition of pictures in color from color records according to my invention, all that is necessary is the addition of the pair of transparent color screens $r$ $g$ composed of any suitable transparent colored materials, such, for instance, as glass, gelatin, or celluloid, and mounted either behind, or before, the lens. Or I may use the color screen and the two-bladed shutter separate from each other instead of combined in one, the said color screens being preferably placed behind the projecting lens, in any position in which it will intercept the beams of light before passing through the pictures to the surface on which the subject is to be exhibited. Fig. 3 shows such color screens with the spaces at $h$ corresponding to the blades of the shutter Fig. 1, the said screens being arranged to work in conjunction with the said shutter. In Fig. 3 the position of the ordinary picture aperture is represented at $i$.

If the color screens and shutter be thus made separately, the apparatus can be used for exhibiting the subject in either colors, or in black and white, as if the said color screens be allowed to remain stationary in the position shown in Fig. 3 while the ordinary shutter (Fig. 1) is rotated, the pictures are projected onto the screen in black and white. A method of accomplishing this is for example shown in Fig. 4. A is the shaft to which is fixed the boss $b$ carrying the opaque shutter B (Fig. 1). The transparent color screens C (Fig. 3) are carried by a boss $c$ mounted loosely on the shaft A. The boss $c$ can be moved along the shaft A by means of lever D pivoted at $d$ and provided with a pin $d^2$ at the end engaging with a groove $c^2$ running around the boss $c$ so that a recess in the boss $c$ can be made to engage with, or be disengaged from, a key, or feather, $a$ on the shaft A and be caused to rotate with the shaft A or not. When the boss $c$ is disengaged from the key, or feather, $a$, the shaft A runs freely within the said boss $c$, the said boss and the color screens C carried by it being then kept stationary by means of any convenient retaining device.

For the taking of the color records, any suitable ordinary bioscope camera can be used, but it must be fitted with color screens and a shutter as hereinbefore described and illustrated.

The film, or series of negatives, or of positive color records, consist, as already explained, of two different color records alternating with each other as indicated in the portion of a film or series shown in Fig. 5 where the records of one color are marked R and those of the other color are marked G.

In order to comply with the requirements of persistence of vision as regards color, it will be necessary to drive the apparatus, both in taking and exhibiting, at a greater speed than that employed with ordinary kinematograph apparatus, say at about double the speed. I have found that a speed which will cause about thirty successive pictures to pass the aperture per second gives good results, causing the persistence of vision of the observer to give him the impression that the colors obtained from the alternating records are superimposed, or blended, so that the moving picture appears to him to be in its natural colors, or approximately so.

Having now particularly described and ascertained the nature of my said invention and in what manner the same is to be performed, I declare that what I claim is:—

1. A kinematograph apparatus for producing images in substantially their natural colors, comprising two color screens of independent colors, means for alternately interposing said screens in the production of successive images whereby succeeding images take the colors of said screens alternately, in combination with a coöperating film having twice the number of images of an ordinary black and white kinematograph film, the images on said film alternating in color values, said color values in screen and film being such as to present to the eye in the blending of each two successive images a kinematographic series in substantially its natural colors.

2. A kinematograph apparatus for producing images in substantially their natural colors, comprising two independent screens of red and green color values respectively and means for alternating the same in the production of successive images, in combination with a coöperating film having twice the number of images of an ordinary black and white kinematograph film, the images on said film having alternate red and green color values, said color values in screens and film being such as to present to the eye in the blending of each two successive images a kinematographic series in substantially its natural colors.

3. A kinematographic apparatus for producing images in substantially their natural colors, comprising two independent color screens of red and green color values respectively and means for alternating the same in the production of successive images, in combination with a coöperating panchromatic film having twice the number of images of an ordinary black and white kinematographic film, the images on said film having alternate red and green color values, said color values in screens and film being such as to present to the eye in the blending of each two successive images a kinematographic series in substantially its natural colors.

In testimony whereof I have signed my name to this specification, in the presence of two subscribing witnesses.

GEORGE ALBERT SMITH.

Witnesses:
GILBERT FLETCHER TYSON,
WILLIAM GERALD REYNOLDS.